United States Patent
Hiromura et al.

(10) Patent No.: US 12,078,494 B2
(45) Date of Patent: Sep. 3, 2024

(54) VEHICLE CONTROL DEVICE

(71) Applicant: ADVICS CO., LTD., Kariya (JP)

(72) Inventors: Tatsuya Hiromura, Kariya (JP); Yosuke Omori, Kariya (JP)

(73) Assignee: ADVICS CO., LTD., Kariya (JP)

( * ) Notice: Subject to any disclaimer, the term of this patent is extended or adjusted under 35 U.S.C. 154(b) by 164 days.

(21) Appl. No.: 17/606,230

(22) PCT Filed: Apr. 7, 2020

(86) PCT No.: PCT/JP2020/015677
§ 371 (c)(1),
(2) Date: Oct. 25, 2021

(87) PCT Pub. No.: WO2020/217974
PCT Pub. Date: Oct. 29, 2020

(65) Prior Publication Data
US 2022/0178708 A1    Jun. 9, 2022

(30) Foreign Application Priority Data

Apr. 25, 2019   (JP) .................................. 2019-084285

(51) Int. Cl.
*G01C 21/34*   (2006.01)
*B60W 40/10*   (2012.01)

(52) U.S. Cl.
CPC ......... *G01C 21/3415* (2013.01); *B60W 40/10* (2013.01); *G01C 21/3461* (2013.01); *G01C 21/3492* (2013.01); *B60W 2552/20* (2020.02)

(58) Field of Classification Search
CPC ............ G01C 21/3415; G01C 21/3461; G01C 21/3492; G05D 2201/0213; B60W 40/10; B60W 2552/20
See application file for complete search history.

(56) References Cited

U.S. PATENT DOCUMENTS

2012/0290173 A1    11/2012   Irie
2015/0274164 A1    10/2015   Terazawa et al.
(Continued)

FOREIGN PATENT DOCUMENTS

JP    2008-143263 A    6/2008
JP    2015189411 A    11/2015
(Continued)

OTHER PUBLICATIONS

English WIPO translation of JP-2016107658-A. (Year: 2016).*
(Continued)

*Primary Examiner* — Jason Holloway
*Assistant Examiner* — Christopher A Buksa
(74) *Attorney, Agent, or Firm* — BUCHANAN INGERSOLL & ROONEY PC

(57) ABSTRACT

A control device of a vehicle controls an actuator of the vehicle to cause the vehicle to travel based on a follow-up route. The control device includes a width information obtaining unit that obtains a road width in which the vehicle can pass on a road on which the vehicle travels. The control device includes a locus follow-up control unit that creates a follow-up route based on the obtained road width. The locus follow-up control unit derives a control amount for causing the vehicle to travel along the follow-up route.

3 Claims, 10 Drawing Sheets

(56) References Cited

U.S. PATENT DOCUMENTS

2019/0084579 A1 3/2019 Maura
2019/0299987 A1* 10/2019 Toda .................... B60W 30/12

FOREIGN PATENT DOCUMENTS

| | | | |
|---|---|---|---|
| JP | 2016107658 A | * | 6/2016 |
| JP | 2017-206181 A | | 11/2017 |
| JP | 2018-167733 A | | 11/2018 |
| JP | 2018-197048 A | | 12/2018 |
| JP | 2019018694 A | | 2/2019 |
| JP | 2019026208 A | | 2/2019 |
| WO | 2011086684 A1 | | 7/2011 |

OTHER PUBLICATIONS

International Search Report (PCT/ISA/210) with translation and Written Opinion (PCT/ISA/237) mailed on Jul. 7, 2020, by the Japan Patent Office as the International Searching Authority for International Application No. PCT/JP2020/015677.

* cited by examiner

VEHICLE CONTROL DEVICE

TECHNICAL FIELD

The present disclosure relates to a vehicle control device.

BACKGROUND ART

Patent Literature 1 discloses a vehicle control device that supports traveling of a vehicle. The control device generates a target locus as a target when performing travel control of the vehicle, and controls the vehicle so that the vehicle follows the target locus.

CITATIONS LIST

Patent Literature

Patent Literature 1: WO 2011/086684 A

SUMMARY

Technical Problems

When the vehicle is subjected to the influence of an external environment while the vehicle is traveling so as to cause the vehicle to follow the target locus, the vehicle may deviate from the target locus. Examples of the influence of the external environment include that the vehicle receives a cross wind, that a wheel of the vehicle passes a step on a road surface, and the like.

Solutions to Problems

A vehicle control device for solving the above problem relates to a vehicle control device that causes a vehicle to travel based on a target route by controlling an actuator of the vehicle, the vehicle control device including a width information obtaining unit that obtains a road width in which the vehicle can pass in a road on which the vehicle travels; a route creation unit that creates the target route based on the obtained road width; and a control unit that derives a control amount for causing the vehicle to travel along the target route and drives the actuator based on the control amount.

According to the above configuration, the vehicle can follow the target route in consideration of the obtained road width. Therefore, even when the vehicle is subjected to the influence of an external environment, the vehicle can be made to travel within a passable range of the vehicle.

DESCRIPTION OF EMBODIMENTS

One embodiment of a vehicle control device will be described with reference to FIGS. 1 to 10.

Figure 1:
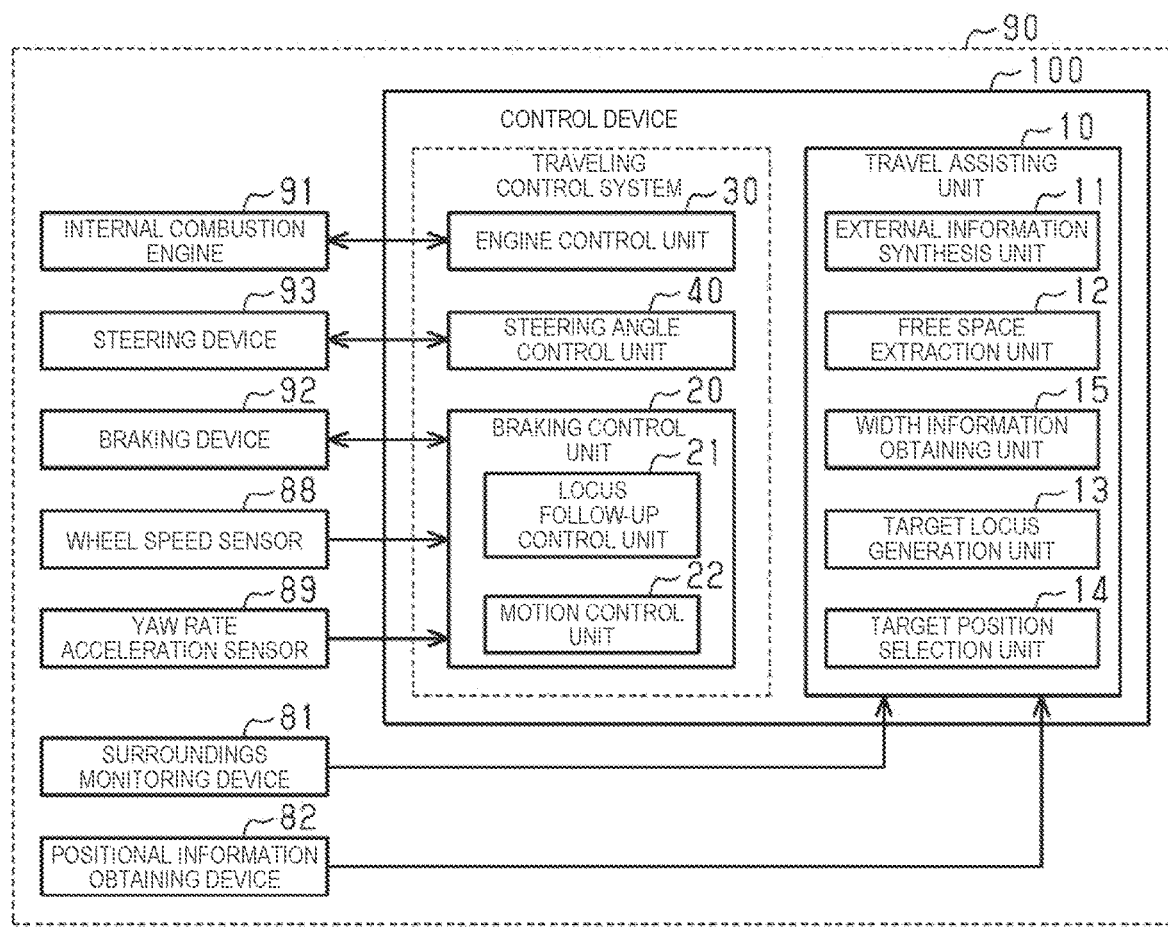
FIG. 1 is a block diagram illustrating one embodiment of a vehicle control device and a vehicle to be controlled by the control device.

FIG. 1 illustrates a vehicle control device 100 and a vehicle 90 to be controlled by the control device 100.

The vehicle 90 includes an internal combustion engine 91 that applies a driving force to the vehicle 90. The vehicle 90 includes a braking device 92 that applies a braking force to the vehicle 90. The vehicle 90 includes a steering device 93 that changes a steering angle of a wheel of the vehicle 90.

The vehicle 90 includes a surroundings monitoring device 81 that monitors the surrounding environment of the vehicle 90. As the surroundings monitoring device 81, for example, a camera, a radar, a detection device using laser light, or the like can be used. The surroundings monitoring device 81 may be configured by combining different types of detection devices. The surroundings monitoring device 81 obtains a road shape and recognizes a lane. In addition, the surroundings monitoring device 81 obtains size and positional information of obstacles existing around the vehicle 90. Examples of the obstacle include other vehicles, pedestrians, guard rails, and walls. The information obtained by the surroundings monitoring device 81 is input to the control device 100.

The vehicle 90 includes a positional information obtaining device 82. The positional information obtaining device 82 has a function of detecting an own vehicle position CP as a current position of the vehicle 90. For example, the positional information obtaining device 82 can be configured by a map information storage unit in which map information is stored, and a reception device of information transmitted from a GPS satellite. The own vehicle position CP obtained by the positional information obtaining device 82 is input to the control device 100.

The vehicle 90 includes various sensors. FIG. 1 illustrates a wheel speed sensor 88 and a yaw rate acceleration sensor 89 as examples of the various sensors.

As illustrated in FIG. 1, detection signals from various sensors included in vehicle 90 are input to the control device 100.

The control device 100 calculates the wheel speed VW based on the detection signal from the wheel speed sensor 88. The control device 100 calculates the vehicle speed VS based on the wheel speed VW. The control device 100 calculates the yaw rate Yr based on the detection signal from the yaw rate acceleration sensor 89. Furthermore, the control device 100 calculates the vehicle acceleration G as the acceleration applied to the vehicle 90 based on the detection signal from the yaw rate acceleration sensor 89.

The control device 100 calculates a slip amount for each wheel of the vehicle 90 based on the wheel speed VW and the vehicle speed VS. The control device 100 estimates the μ value of the road surface on which the vehicle 90 is traveling based on the calculated slip amount.

The control device 100 includes an engine control unit 30, a steering angle control unit 40, and a braking control unit 20 as a travel control system that controls traveling of the vehicle 90. The engine control unit 30, the steering angle control unit 40, and the braking control unit 20 are ECUs communicably connected to each other. Note that "ECU" is an abbreviation for "Electronic Control Unit".

The engine control unit 30 drives an actuator included in the internal combustion engine 91 to control the internal combustion engine 91. The actuator included in the internal combustion engine 91 is a fuel injection valve, an ignition device, a throttle valve, or the like.

The steering angle control unit 40 drives an actuator included in the steering device 93 to control the steering angle of the vehicle 90.

The braking control unit 20 includes a locus follow-up control unit 21 and a motion control unit 22 as functional units. The motion control unit 22 drives an actuator included in the braking device 92 to control the braking force applied to the vehicle 90. Furthermore, the motion control unit 22 can cause the vehicle 90 to travel by instructing the engine control unit 30 and the steering angle control unit 40 to drive the internal combustion engine 91 and the steering device 93.

The locus follow-up control unit 21 executes travel control for supporting travel of the vehicle 90 together with a travel assisting unit 10 described later. The locus follow-up control unit 21 executes a process of calculating a movable range PA as a range that the vehicle 90 is able to reach when the vehicle 90 is caused to travel with the own vehicle position CP as a starting point. The movable range PA is calculated based on a vehicle model in which vehicle characteristics of the vehicle 90 are stored. The vehicle model is stored in the braking control unit 20. The vehicle model includes, for example, a wheelbase which is a distance between front and rear wheels, a tread which is a distance between left and right wheels, a weight of the vehicle 90, a maximum angle of a steering angle, a maximum speed of the vehicle speed VS, and the like. Based on such a vehicle model, the locus follow-up control unit 21 calculates the movable range PA by estimating the motion state quantity of the vehicle 90 accompanying the drive when the actuator of the vehicle 90 is driven. The current state of the vehicle 90 and the μ value of the road surface are also used to calculate the movable range PA. The current state of the vehicle 90 includes, for example, a vehicle speed VS, a yaw rate Yr, a vehicle acceleration G, a steering angle, and the like.

The control device 100 can execute travel control for supporting travel of the vehicle. In the travel control, the control device 100 controls the traveling of the vehicle 90 so that the vehicle 90 travels following the generated target locus TL.

The control device 100 includes the travel assisting unit 10 as an ECU related to travel control. The travel assisting unit 10 is communicably connected to the braking control unit 20. The travel assisting unit 10 includes, as functional units, an external information synthesis unit 11, a free space extraction unit 12, a target locus generation unit 13, a target position selection unit 14, and a width information obtaining unit 15.

Figure 2:
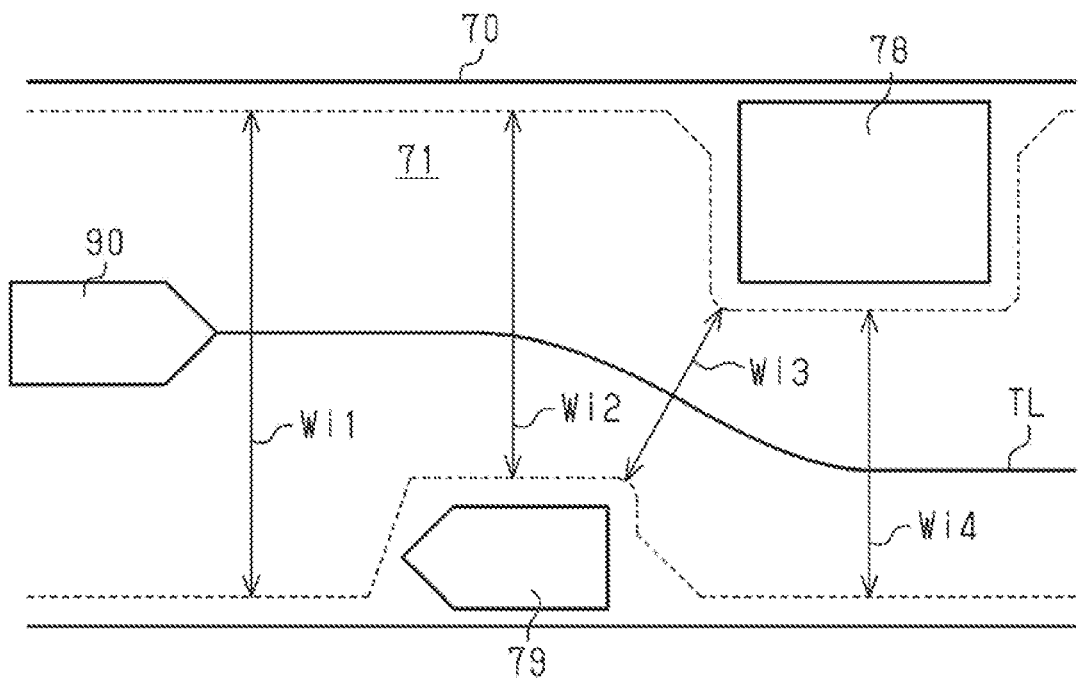
FIG. 2 is a schematic diagram illustrating an environment around a vehicle recognized by the control device.

Each functional unit included in the travel assisting unit 10 will be described with reference to FIG. 2. FIG. 2 illustrates an example of a road 70 on which the vehicle 90 travels. An obstacle 78 and another vehicle 79 are present on the road 70.

The external information synthesis unit 11 synthesizes the information obtained by the surroundings monitoring device 81 to grasp the environment on the road 70. The external information synthesis unit 11 synthesizes the information on the road 70 and the own vehicle position CP obtained by the positional information obtaining device 82 to grasp the environment around the vehicle 90. That is, the external information synthesis unit 11 synthesizes the information such as the shape of the road 70, the obstacle 78 and the other vehicle 79 with the own vehicle position CP to create information for grasping the positional relationship among the vehicle 90, the obstacle 78, and the other vehicle 79 on the road 70, as illustrated in FIG. 2.

The free space extraction unit 12 extracts, as the free space 71, a region where the vehicle 90 can travel in the road 70 on which the vehicle 90 travels based on the information for grasping the positional relationship among the vehicle 90, the obstacle 78, and the other vehicle 79 on the road 70 synthesized by the external information synthesis unit 11. FIG. 2 illustrates free space 71 as a region surrounded by a broken line.

Figure 10:
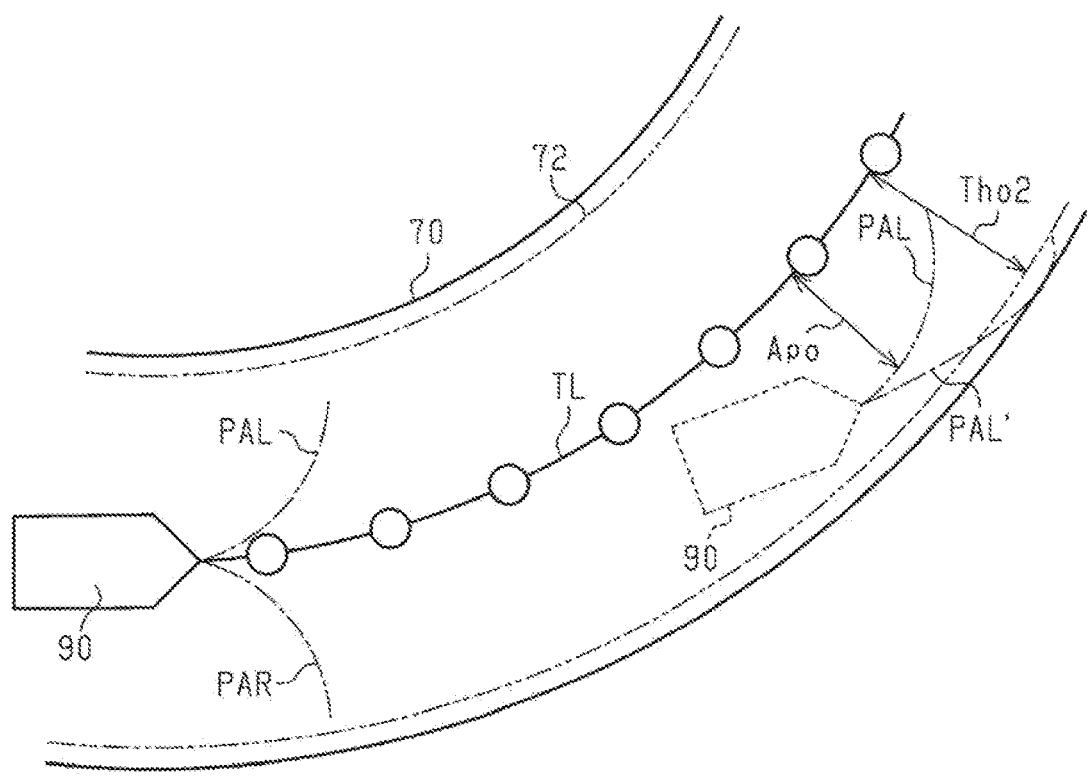
FIG. 10 is a schematic diagram illustrating an example of predicting that a vehicle will deviate from a target locus based on a movable range of the vehicle.

The target locus generation unit 13 generates a target locus TL for causing the vehicle 90 to travel in the travel control. As illustrated in FIG. 2, the target locus generation unit 13 generates the target locus TL so that the vehicle 90 can pass through the free space 71. When generating the target locus TL, the target locus generation unit 13 uses the movable range PA calculated by the locus follow-up control unit 21 of the braking control unit 20. An example of the movable range PA is illustrated in FIG. 10. FIG. 10 illustrates a state in which the vehicle 90 travels on the road 70. In FIG. 10, a left boundary line PAL and a right boundary line PAR representing the range of the movable range PA of the vehicle 90 are indicated by one-dot chain line. The left boundary line PAL indicates a boundary line between a reachable range and an unreachable range when the forward moving vehicle 90 makes a left turn. The right boundary line PAR indicates a boundary line between a reachable range and an unreachable range when the forward moving vehicle 90 makes a right turn. That is, a range between the left boundary line PAL and the right boundary line PAR is the movable range PA.

The target position selection unit 14 selects the target position TP from a portion on a front side of the vehicle 90 with respect to the own vehicle position CP in the target locus TL generated by the target locus generation unit 13. The target position TP is set as a target for guiding the vehicle 90 in the travel control. The target position selection unit 14 repeats the selection of the target position TP based on the own vehicle position CP, the movable range PA, and the like while the travel control is being executed.

As illustrated in FIG. 2, the width information obtaining unit 15 calculates, as a road width Wi, information on a width of a region where the vehicle 90 can travel in the road 70 in front of the vehicle 90 with respect to the own vehicle position CP based on the target locus TL and the free space 71. For example, the road width Wi is a length from one end to the other end of the free space 71 in a direction orthogonal to both the target locus TL and the vertical direction of the vehicle 90. FIG. 2 illustrates four examples of the road width Wi. In the example illustrated in FIG. 2, a road width Wi at a position where there is no obstacle in the free space 71 is indicated as a first road width Wi1. In FIG. 2, a road width Wi when the vehicle 90 traveling following the target locus TL passes the side of the other vehicle 79 is indicated as a second road width Wi2. Furthermore, a road width Wi when the vehicle 90 passes between the other vehicle 79 and the obstacle 78 is indicated as a third road width Wi3. Moreover, a road width Wi when the vehicle 90 passes the side of the obstacle 78 is indicated as a fourth road width Wi4. The width information obtaining unit 15 obtains not only the four road widths Wi illustrated in FIG. 2 but also the road width Wi at each of a plurality of points on the target locus TL.

An example of a travel control executed by the control device 100 will be described. In the travel control, the follow-up route FT is calculated as a route for causing the vehicle 90 to travel along the target locus TL generated by the target locus generation unit 13. The follow-up route FT is calculated by the locus follow-up control unit 21. For example, when the vehicle 90 is traveling on the target locus TL, the follow-up route FT is calculated as a route on the target locus TL. A control amount Ac for causing the vehicle 90 to travel along the follow-up route FT is calculated by the locus follow-up control unit 21 based on the follow-up route FT. The vehicle 90 is controlled based on the control amount Ac, so that the vehicle 90 travels along the follow-up route FT. As a result, the traveling of the vehicle 90 is controlled so as to follow the target locus TL.

Figure 6:
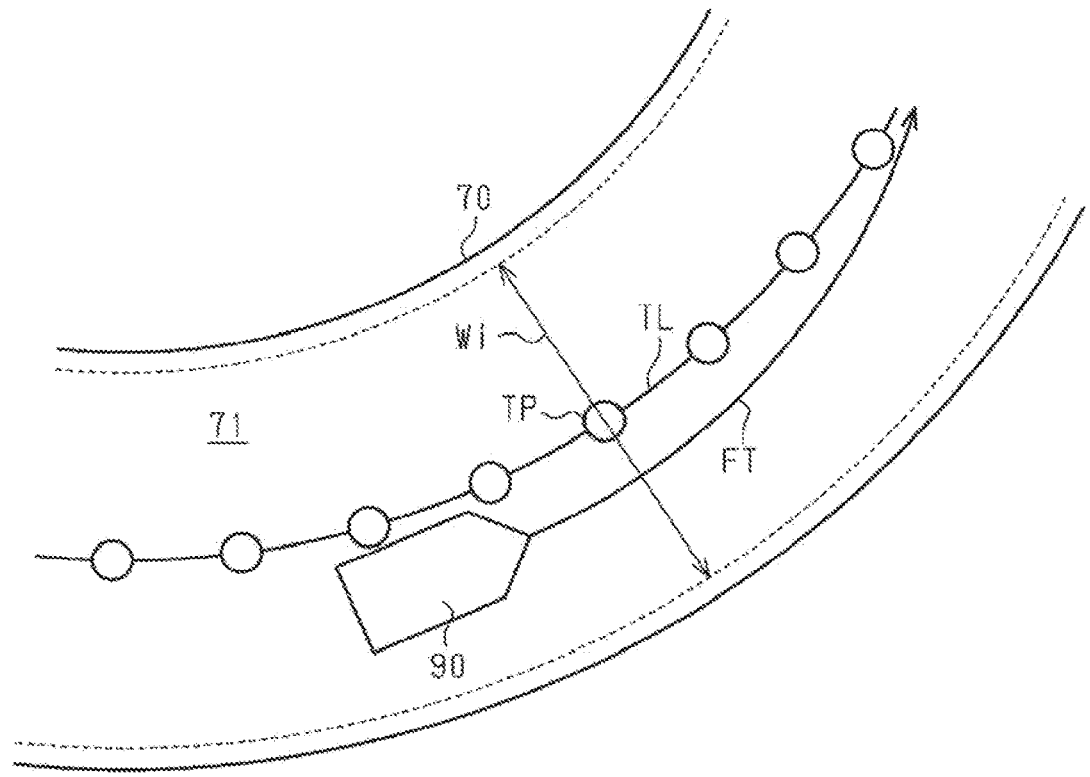
FIG. 6 is a schematic diagram illustrating a travel route of the vehicle when the control device causes the vehicle to travel based on a target locus.

The locus follow-up control unit 21 uses the road width Wi obtained by the width information obtaining unit 15 for calculation of the follow-up route FT. The locus follow-up control unit 21 uses the road width Wi as a range in which the vehicle 90 can pass in the lateral direction of the vehicle 90. That is, the locus follow-up control unit 21 uses the road width Wi as a range in which deviation of the own vehicle position CP is allowed in a direction orthogonal to both the vertical direction of the vehicle 90 and the target locus TL with respect to the target position TP selected from the target locus TL. Therefore, when the vehicle 90 is deviated from the target locus TL, for example, as illustrated in FIG. 6, the follow-up route FT is calculated such that the own vehicle position CP gradually approaches the target locus TL while the vehicle 90 is caused to travel within the range of the road width Wi. That is, the locus follow-up control unit 21 calculates the follow-up route FT, and derives a follow-up control amount for causing the vehicle to follow the target locus TL within the range of the road width Wi as the control amount Ac. The braking control unit 20 executes a follow-up control for instructing the drive of the actuator by the motion control unit 22 based on the control amount Ac.

Note that the deviation of the vehicle 90 from the target locus TL when the travel control is being executed may occur, for example, due to the influence of the external environment on the vehicle 90. Examples of the influence of the external environment include a road surface condition such as freezing or ruts, a cross wind, and the like.

A flow of processing when the travel assisting unit 10 of the control device 100 generates the target locus TL and selects the target position TP on the target locus TL will be described with reference to FIGS. 3 and 4.

Figure 3:
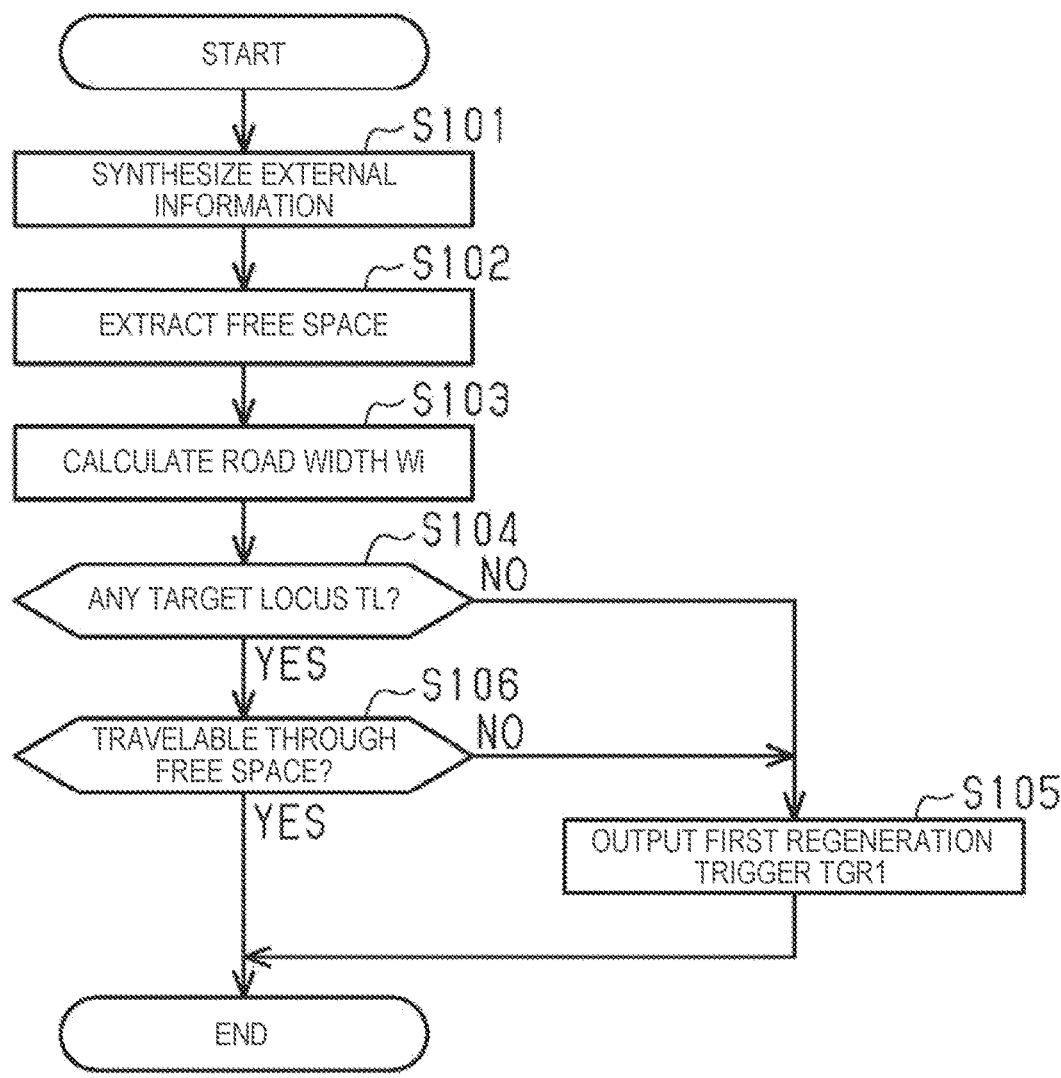
FIG. 3 is a flowchart illustrating a flow of processing executed when the control device generates a target locus.

The processing routine illustrated in FIG. 3 is a processing routine for starting generation of the target locus TL. This processing routine is repeatedly executed every predetermined intervals when the travel control is being performed.

When this processing routine is started, first, in step S101, the external information synthesis unit 11 of the travel assisting unit 10 synthesizes the external information of the vehicle 90. Specifically, the external information synthesis unit 11 synthesizes the information obtained from the surroundings monitoring device 81 and the positional information obtaining device 82. The travel assisting unit 10 grasps information such as a road on which the vehicle 90 travels based on the information synthesized by the external information synthesis unit 11. Thereafter, the process proceeds to step S102.

In step S102, the free space extraction unit 12 extracts the free space 71 based on the information synthesized by external information synthesis unit 11 in step S101. Thereafter, the process proceeds to step S103.

In step S103, the width information obtaining unit 15 calculates the road width Wi of the road 70 in front of the vehicle 90 with respect to the own vehicle position CP. Thereafter, the process proceeds to step S104.

In step S104, the travel assisting unit 10 determines whether the target locus TL ahead of the current position of the vehicle 90 has already been generated. When the target locus TL has not yet been generated yet (S104: NO), the process proceeds to step S105. In step S105, the travel assisting unit 10 outputs a first regeneration trigger TGR1. The first regeneration trigger TGR1 is a signal that the travel assisting unit 10 requests to the target locus generation unit 13 to generate the target locus TL. When the first regeneration trigger TGR1 is output, the present processing routine is terminated.

On the other hand, when the target locus TL ahead of the current position of the vehicle 90 has already been generated in the process of step S104 (S104: YES), the process proceeds to step S106. In step S106, the travel assisting unit 10 determines whether the vehicle 90 traveling based on the target locus TL can travel in the free space 71. When the target locus TL does not run out from the region of the free space 71, the travel assisting unit 10 determines that the vehicle 90 can travel in the free space 71. When the vehicle 90 can travel in the free space 71 (S106: YES), this processing routine is terminated.

On the other hand, when the target locus TL runs out from the region of the free space 71, the travel assisting unit 10 determines that the vehicle 90 cannot travel in the free space 71. When the vehicle 90 cannot travel in the free space 71 (S106: NO), the process proceeds to step S105. In step S105, the travel assisting unit 10 outputs a first regeneration trigger TGR1. That is, the travel assisting unit 10 requests the target locus generation unit 13 to regenerate the target locus TL. When the first regeneration trigger TGR1 is output, the present processing routine is terminated.

Figure 4:
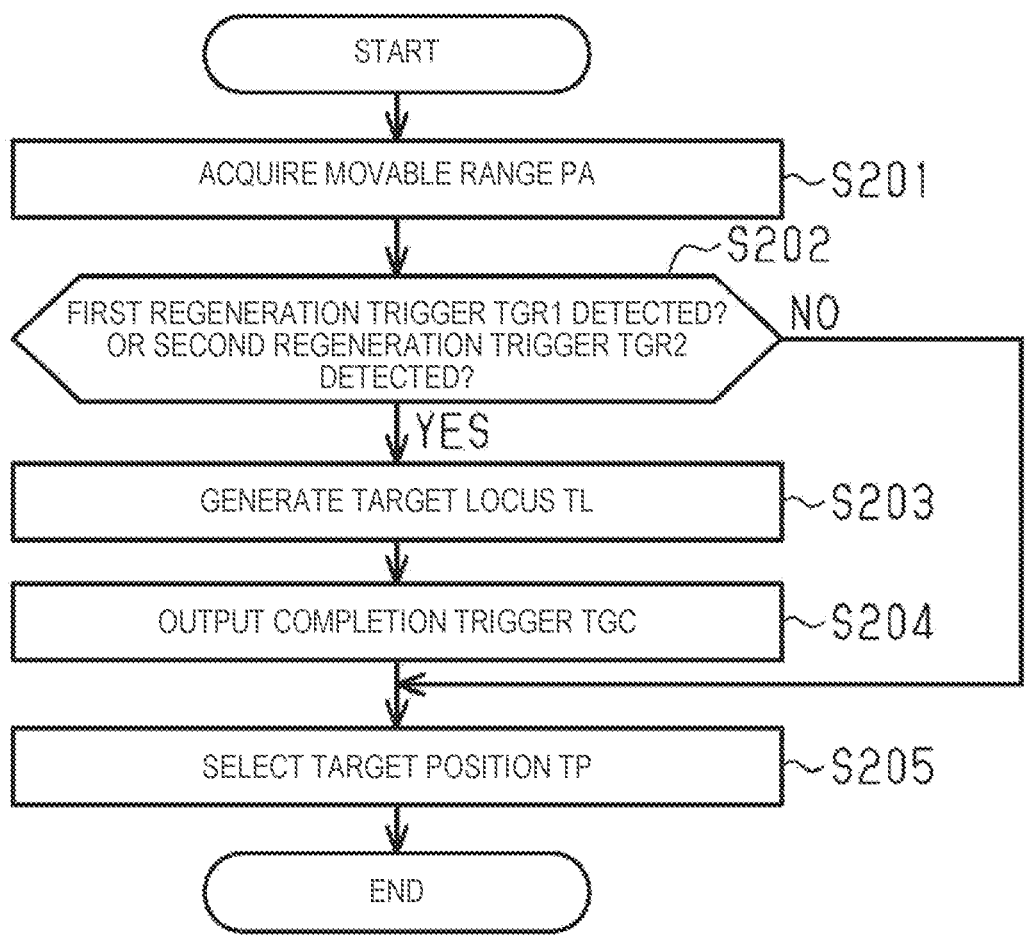
FIG. 4 is a flowchart illustrating a flow of processing executed when the control device generates a target locus.

The processing routine illustrated in FIG. 4 is a processing routine for selecting the target position TP. This processing routine is repeatedly executed every predetermined intervals when the travel control is being performed.

When the present processing routine is started, first, in step S201, the travel assisting unit 10 obtains the movable range PA calculated by the braking control unit 20. Thereafter, the process proceeds to step S202.

In step S202, the target locus generation unit 13 determines whether the first regeneration trigger TGR1 or the second regeneration trigger TGR2 is detected. As will be described in detail later, the second regeneration trigger TGR2 is a signal output from the braking control unit 20 to the travel assisting unit 10 through the process executed by the braking control unit 20. When the first regeneration trigger TGR1 is detected (S202: YES), the process proceeds to step S203. Also, when the second regeneration trigger TGR2 is detected (S202: YES), the process proceeds to step S203. In addition, also when both the first regeneration trigger TGR1 and the second regeneration trigger TGR2 are detected, the process proceeds to step S203.

In step S203, the target locus generation unit 13 generates the target locus TL. When the target locus TL is generated, the process proceeds to step S204, and the travel assisting unit 10 outputs the completion trigger TGC to the braking control unit 20. The completion trigger TGC is a signal for transmitting that the generation of the target locus TL is completed. When the completion trigger TGC is output, the process proceeds to step S205.

On the other hand, in a case where neither the first regeneration trigger TGR1 nor the second regeneration trigger TGR2 is detected in the processing of step S202 (S202: NO), the process proceeds to step S205. That is, in a case where neither the first regeneration trigger TGR1 nor the second regeneration trigger TGR2 is detected, the processing of steps S203 and S204 is not executed.

In step S205, the target position selection unit 14 selects the target position TP from the target locus TL. The target position selection unit 14 extracts points within the movable range PA from the target locus TL based on the own vehicle position CP and the movable range PA, and selects the extracted points as the target position TP. When there are a plurality of points on the target locus TL within the movable range PA, one of the plurality of points is selected as the target position TP. When the target position TP is selected, the present processing routine is terminated.

Figure 5:
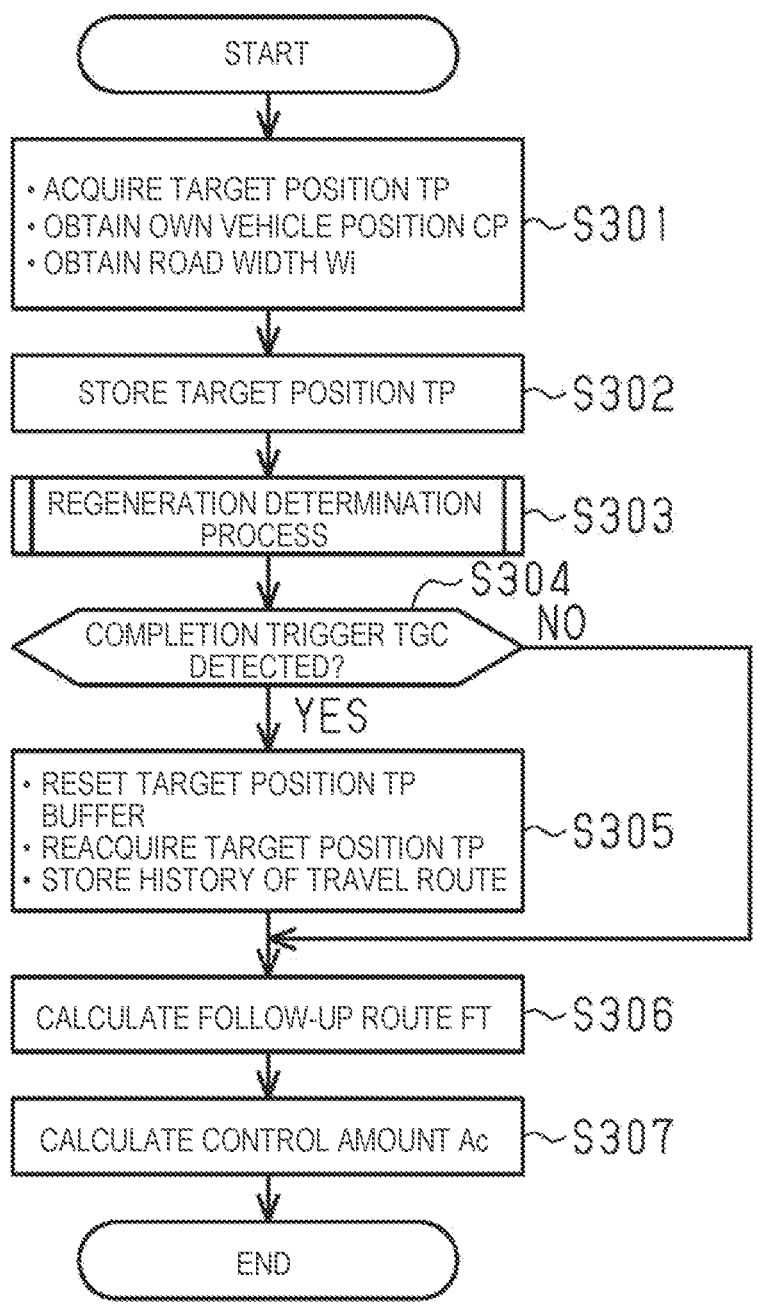
FIG. 5 is a flowchart illustrating a flow of processing executed when the control device causes the vehicle to travel based on a target locus.

A flow of processing executed by the braking control unit 20 of the control device 100 will be described with reference to FIG. 5. The processing routine illustrated in FIG. 5 is a processing routine for calculating the follow-up route FT and the control amount Ac. This processing routine is repeatedly executed every predetermined intervals when the travel control is being performed.

When the present processing routine is started, first, in step S301, the braking control unit 20 obtains information from the travel assisting unit 10. The braking control unit 20 obtains, as information, the own vehicle position CP, the target position TP selected by the target position selection unit 14, and the road width Wi calculated by the width information obtaining unit 15. Thereafter, the process proceeds to step S302. In step S302, the locus follow-up control unit 21 of the braking control unit 20 newly stores the target position TP obtained in step S301 while holding the already stored history of the target position TP. Thereafter, the process proceeds to step S303.

In step S303, the locus follow-up control unit 21 executes the regeneration determination process. The contents of the regeneration determination process will be described later with reference to FIG. 8. When the regeneration determination process is terminated, the process proceeds to step S304.

In step S304, the locus follow-up control unit 21 determines whether or not the completion trigger TGC is detected. The completion trigger TGC is output from the travel assisting unit 10 to the braking control unit 20. When the completion trigger TGC is detected (S304: YES), the process proceeds to step S305.

In step S305, the locus follow-up control unit 21 resets the stored history of the target position TP. The locus follow-up control unit 21 reobtains the target position TP from the travel assisting unit 10. Furthermore, the locus follow-up control unit 21 obtains and stores a history of routes on which the vehicle 90 has traveled. The detection of the completion trigger TGC in the process of step S304 means that the target locus TL is regenerated. That is, when the target locus TL is regenerated, the locus follow-up control unit 21 erases the target position TP stored before the target locus TL is regenerated in the process of step S305. Then, the locus follow-up control unit 21 obtains the latest target position TP selected based on the regenerated target locus TL. Thereafter, the process proceeds to step S306.

On the other hand, when the completion trigger TGC is not detected in the process of step S304 (S304: NO), the process proceeds to step S306. That is, when the completion trigger TGC is not detected, the process of step S305 is not executed.

In step S306, the locus follow-up control unit 21 calculates the follow-up route FT for causing the vehicle 90 to travel along the target locus TL based on the road width Wi. Thereafter, the process proceeds to step S307, and the locus follow-up control unit 21 calculates a control amount Ac for causing the vehicle 90 to travel along the follow-up route FT. That is, the control amount for the internal combustion engine 91, the control amount for the steering device 93, and the control amount for the braking device 92 are calculated as the control amount Ac. When the control amount Ac is calculated, the present processing routine is terminated.

When the control amount Ac is calculated by the locus follow-up control unit 21, the motion control unit 22 of the braking control unit 20 executes the process of instructing each actuator of the vehicle 90 to drive based on the control amount Ac. That is, the braking control unit 20 controls the actuator of the braking device 92 based on the control amount for the braking device 92. The engine control unit 30 controls the actuator of the internal combustion engine 91 based on the control amount for the internal combustion engine 91. The steering angle control unit 40 controls the actuator of the steering device 93 based on the control amount for the steering device 93.

Figure 7:
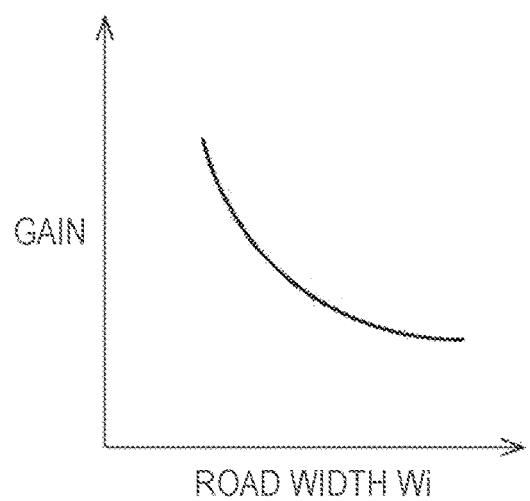
FIG. 7 is a diagram illustrating a relationship between a gain of feedback control used by the control device to calculate a control amount and a road width.

The follow-up route FT and the control amount Ac will be described with reference to FIGS. 6 and 7.

FIG. 6 illustrates a state when vehicle 90 travels on the road 70 by execution of travel control. The target locus TL is generated by the target locus generation unit 13 according to the shape of the road 70. A point on the target locus TL is selected as the target position TP by the target position selection unit 14. In the example illustrated in FIG. 6, the vehicle 90 is deviated from the target locus TL. As illustrated in FIG. 6, the locus follow-up control unit 21 calculates a follow-up route FT as a route for gradually bringing the own vehicle position CP closer to the target locus TL while causing the vehicle 90 to travel in the range of the road width Wi. In other words, the follow-up route FT is a route in which the vehicle 90 deviated from the target locus TL passes the side of the target position TP in the range of the road width Wi.

As illustrated in FIG. 6, when the follow-up control for causing the vehicle 90 to follow the target locus TL within the range of the road width Wi is executed, the locus follow-up control unit 21 creates the follow-up route FT as a route for urging the vehicle 90 to make a sudden turn as the road width Wi is narrower. That is, the locus follow-up control unit 21 creates, as the follow-up route FT, a route that rapidly decreases the deviation degree between the own vehicle position CP and the target locus TL as the road width Wi is narrower. After creating the follow-up route FT, the locus follow-up control unit 21 calculates a control amount Ac for causing the vehicle 90 to travel along the follow-up route FT. For example, the locus follow-up control unit 21 calculates the control amount Ac by feedback control using the deviation degree between the own vehicle position CP and the target locus TL as an input. FIG. 7 illustrates a relationship between the gain of the feedback control and the road width Wi in the feedback control. As illustrated in FIG. 7, the gain of the feedback control is set larger, the smaller the road width Wi. Therefore, the control amount Ac is calculated larger the smaller the road width Wi, and the vehicle 90 is urged to make a sudden turn.

Figure 8:
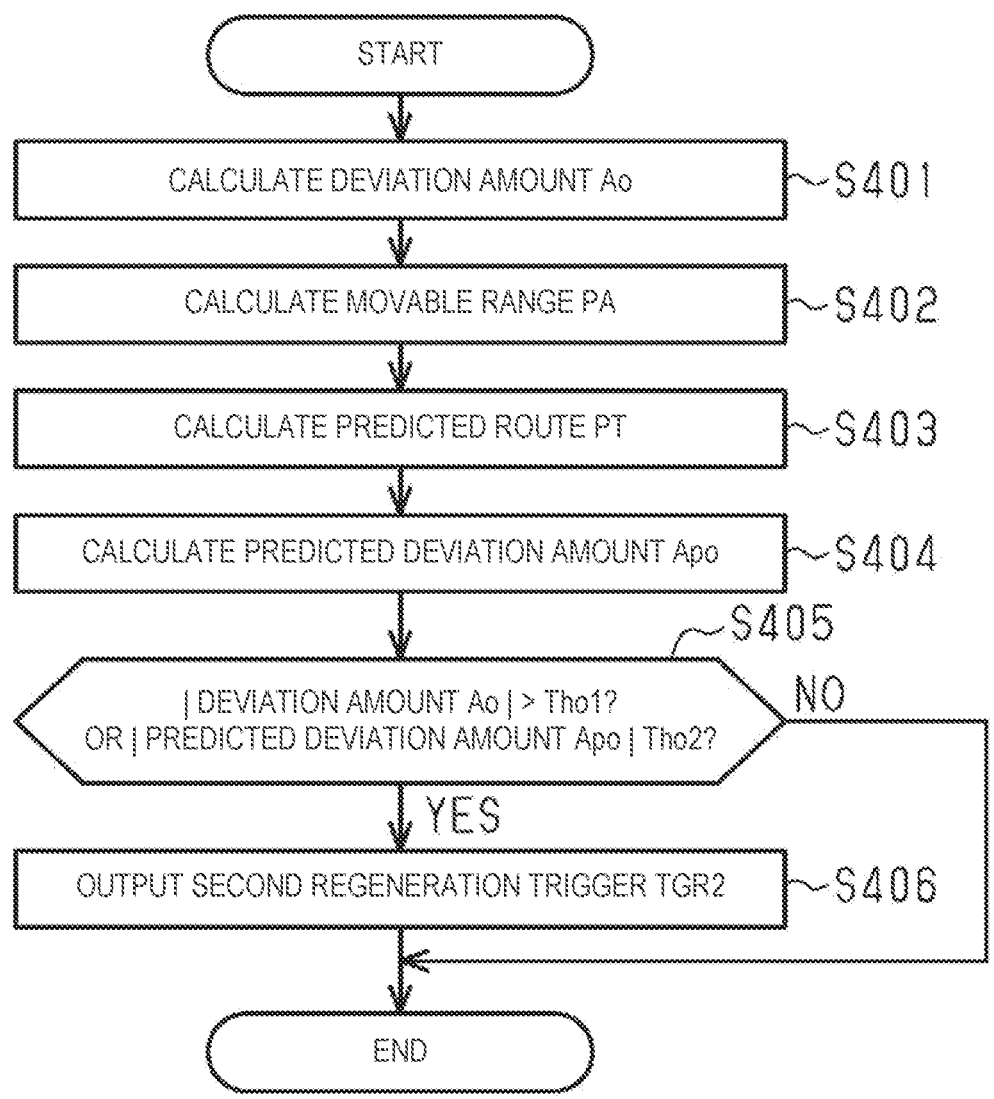
FIG. 8 is a flowchart illustrating a flow of processing executed by the control device to determine whether the vehicle deviates from the target locus.

FIG. 8 illustrates a processing routine of the regeneration determination process in step S303 in FIG. 5.

When the present processing routine is started, first, in step S401, the locus follow-up control unit 21 calculates the distance between the own vehicle position CP and the target position TP as a deviation amount Ao. The deviation amount Ao is a value indicating the deviation degree of the vehicle 90 with respect to the target locus TL. The deviation amount Ao is calculated as a positive value, for example, when the own vehicle position CP exists in a region on the right side with respect to the target locus TL in the advancing direction of the vehicle 90. In this case, the deviation amount Ao increases the more the vehicle 90 deviates from the target locus TL. On the other hand, the deviation amount Ao is calculated as a negative value when the own vehicle position CP exists in a region on the left side with respect to the target locus TL in the advancing direction of the vehicle 90. In this case, the deviation amount Ao decreases the more the vehicle 90 deviates from the target locus TL. When the deviation amount Ao is calculated, the process proceeds to step S402.

In step S402, the locus follow-up control unit 21 calculates the movable range PA. When the movable range PA is calculated, the process proceeds to step S403.

In step S403, the locus follow-up control unit 21 calculates a predicted route PT based on the own vehicle position CP and the movable range PA. The predicted route PT is a route within the range of the movable range PA. The predicted route PT is calculated as, for example, a route for bringing an intersection point between the movable range PA and the target locus TL closest to the target position TP. In this case, when the target position TP is located within the movable range PA, a route connecting the own vehicle position CP and the target position TP is calculated as the predicted route PT. On the other hand, when the target position TP is located outside the movable range PA, a route along the left boundary line PAL or the right boundary line PAR is calculated as the predicted route PT. Thereafter, the process proceeds to step S404.

In step S404, the locus follow-up control unit 21 calculates a predicted deviation amount Apo based on the target locus TL and the predicted route PT. The locus follow-up control unit 21 calculates a deviation amount between the target locus TL and the predicted route PT at a position where the predicted route PT is farthest from the target locus TL as the predicted deviation amount Apo. The predicted deviation amount Apo is a predicted value of the deviation degree of the vehicle 90 with respect to the target locus TL. The predicted deviation amount Apo is calculated as a positive value when the predicted route PT is included in a region on the right side with respect to the target locus TL in the advancing direction of the vehicle 90. In this case, the predicted deviation amount Apo increases the greater the predicted deviation degree. On the other hand, the predicted deviation amount Apo is calculated as a negative value when the predicted route PT is included in the region on the left side with respect to the target locus TL in the advancing direction of the vehicle 90. In this case, the predicted deviation amount Apo decreases the greater the predicted deviation degree. When the predicted deviation amount Apo is calculated, the process proceeds to step S405.

In step S405, the locus follow-up control unit 21 determines whether the magnitude of the deviation amount Ao is larger than a first deviation threshold value Tho1. In step S405, the locus follow-up control unit 21 determines whether the magnitude of the predicted deviation amount Apo is larger than a second deviation threshold value Tho2. When the magnitude of the deviation amount Ao is less than or equal to the first deviation threshold value Tho1 and the magnitude of the predicted deviation amount Apo is less than or equal to the second deviation threshold value Tho2 (S405: NO), the present processing routine is terminated.

On the other hand, in the process of step S405, when the magnitude of the deviation amount Ao is larger than the first deviation threshold value Tho1 (S405: YES), the process proceeds to step S406. In addition, also when the magnitude of the predicted deviation amount Apo is larger than the second deviation threshold value Tho2 (S405: YES), the process proceeds to step S406. In step S406, the locus follow-up control unit 21 outputs the second regeneration trigger TGR2 to the travel assisting unit 10. The second regeneration trigger TGR2 is a signal that the locus follow-up control unit 21 requests the target locus generation unit 13 to regenerate the target locus TL. When the second regeneration trigger TGR2 is output, the present processing routine is terminated.

The first deviation threshold value Tho1 and the second deviation threshold value Tho2 are respectively set to values calculated by the travel assisting unit 10. The travel assisting unit 10 sets a deviation allowable region 72, as indicated by a two-dot chain line in FIG. 10, as a region that allows the vehicle 90 to deviate from the target locus TL based on the shape of the road 70 on which the vehicle 90 travels. The travel assisting unit 10 sets the first deviation threshold value Tho1 and the second deviation threshold value Tho2 based on the deviation allowable region 72.

In addition, the first deviation threshold value Tho1 is set as a value larger than the second deviation threshold value Tho2 which is the predicted deviation threshold value. In the flow of processing illustrated in FIG. 8, when the magnitude of the predicted deviation amount Apo is less than or equal to the second deviation threshold value Tho2, the second regeneration trigger TGR2 is not output. However, in a case where the vehicle 90 is greatly deviated from the target locus TL more than predicted and the deviation amount Ao greatly exceeds the predicted deviation amount Apo, when the magnitude of the deviation amount Ao becomes larger than the first deviation threshold value Tho1, the second regeneration trigger TGR2 is output.

Operations and effects of the present embodiment will be described.

In the control device 100, the locus follow-up control unit 21 calculates the follow-up route FT as a route that gradually brings the own vehicle position CP closer to the target locus TL while causing the vehicle 90 to travel in the range of the road width Wi. At this time, the follow-up route FT is calculated in consideration of the road width Wi. Then, by causing the vehicle 90 to travel along the follow-up route FT, the vehicle 90 can be caused to follow the target locus TL in consideration of the road width Wi. Therefore, even when the vehicle 90 deviates from the target locus TL due to the influence of the external environment, the vehicle 90 can be made to travel in a range where the vehicle 90 can pass in the road 70.

In the control device 100, the road width Wi serving as a range where the vehicle 90 can pass is obtained by the braking control unit 20 together with the target locus TL. That is, the braking control unit 20 can grasp the range where the vehicle 90 can pass in the road 70. Therefore, the follow-up route FT is created on the braking control unit 20 side, and the vehicle 90 can be caused to travel following the follow-up route FT. Therefore, when the vehicle 90 deviates from the target locus TL, the travel control can be continued only by the follow-up control by the braking control unit 20 without involving the regeneration of the target locus TL.

Here, a case where, when the vehicle 90 is deviated from the target locus TL, a route connecting the target position TP selected at that time and the own vehicle position CP is created as the follow-up route FT will be considered. In this case, if the distance between the target position TP and the own vehicle position CP is too close, the vehicle 90 makes a sudden turn when the vehicle 90 is caused to travel following the follow-up route FT, which may give discomfort to the occupant of the vehicle 90. In this regard, in the control device 100, a route that gradually reduces the deviation degree between the target locus TL and the position of the vehicle 90 is calculated as the follow-up route FT. That is, a route connecting the target position TP selected at the time when the follow-up route FT is calculated and the own vehicle position CP is not created as the follow-up route FT. As a result, the vehicle 90 can be suppressed from being directed toward the target position TP with a sudden turn when the vehicle 90 is deviated from the target locus TL.

The control device 100 creates the follow-up route FT in consideration of the road width Wi. That is, a route that urges the vehicle 90 to make a sudden turn as the road width Wi becomes narrower is created as the follow-up route FT. Then, the vehicle 90 can be caused to travel so as not to deviate from the road 70 even if the road width Wi is narrow by causing the vehicle 90 to travel according to the follow-up route FT. On the other hand, when the road width Wi is wide, the follow-up route FT is created such that the deviation degree between the target locus TL and the position of the vehicle 90 gradually decreases. Then, by causing the vehicle 90 to travel according to the follow-up route FT, a rapid change in the momentum of the vehicle 90 during the follow-up control is suppressed. As a result, the occupant of the vehicle 90 is less likely to feel discomfort.

Furthermore, in the control device 100, the gain of the feedback control when calculating the control amount Ac is set to be larger as the road width Wi obtained at the time of creating the follow-up route FT becomes narrower. The control amount Ac tends to increase as the gain increases. Therefore, when the follow-up route FT that urges the vehicle 90 to make a sudden turn is created because the road width Wi is narrow, the gain of the feedback control is increased, and the control amount Ac tends to be increased. The vehicle 90 thus can be easily caused to travel according to the follow-up route FT by driving the actuator of the vehicle based on such a control amount Ac. That is, the traveling of the vehicle along the follow-up route FT can be realized.

On the other hand, in a case where the follow-up route FT that urges the vehicle 90 to make a gentle turn is created because the road width Wi is wide, the control amount Ac may become excessively large if the gain of the feedback control is large. In this case, when the actuator is driven based on the control amount Ac, hunting in which increase and decrease of the control amount Ac are repeated may occur. In this regard, in the control device 100, the gain of the feedback control is set smaller as the road width Wi becomes wider. That is, the control amount Ac is less likely to increase. This makes it possible to suppress the occurrence of hunting when the vehicle 90 is caused to travel along the follow-up route FT.

Even when the target locus TL and the position of the vehicle 90 are not deviated, the target locus TL may be generated such that the turning amount of the vehicle 90 increases due to the change in the road width Wi. Even in such a case, the vehicle 90 can be easily caused to travel along the target locus TL by increasing the gain of the feedback control as the road width Wi becomes narrower.

Figure 9:
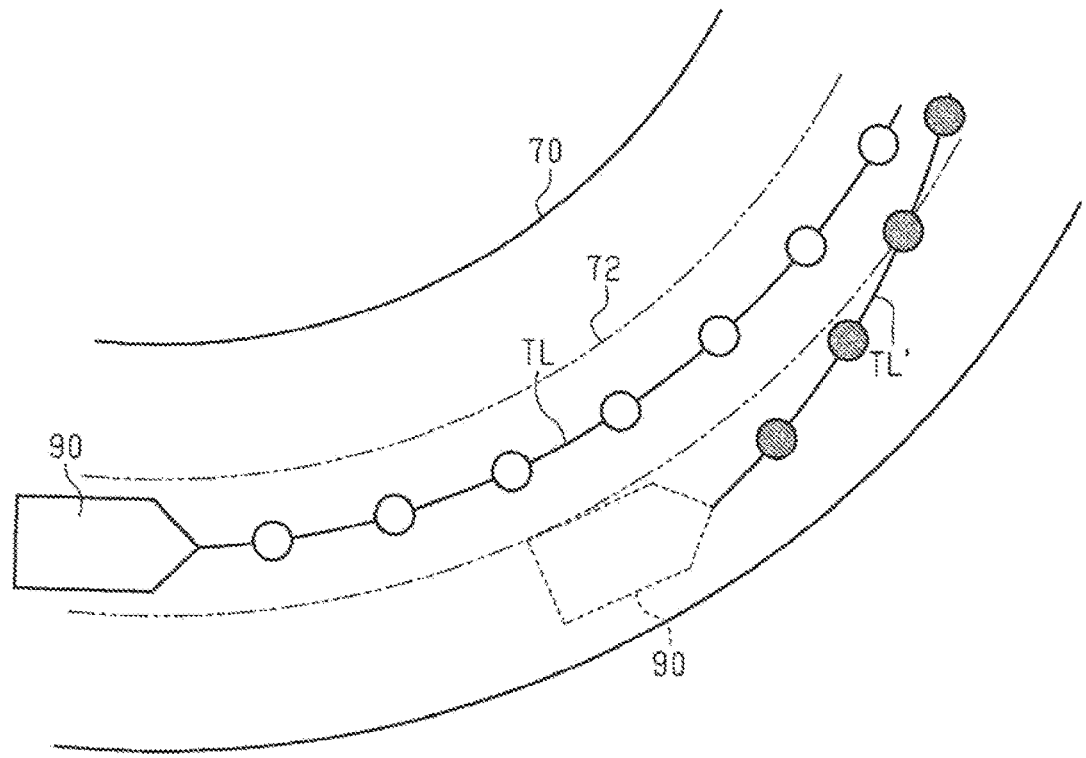
FIG. 9 is a schematic diagram illustrating a vehicle deviated from a target locus and a target locus regenerated by a control device of a comparative example.

FIG. 9 illustrates a vehicle 90 in which travel control is performed by the control device of the comparative example. The control device of the comparative example does not have a configuration for calculating the predicted deviation amount Apo. Therefore, in the control device of the comparative example, when the vehicle 90 is deviated from the target locus TL and the magnitude of the deviation amount Ao becomes larger than the threshold value, the target locus TL is regenerated. In other words, the target locus TL is not regenerated unless the actual deviation degree from the target locus TL of the vehicle 90 increases. For this reason, in order to suppress the vehicle 90 from crossing the boundary line of the road 70, a locus that urges a sudden turn of the vehicle 90 may be regenerated as the target locus TL. In order to suppress such a sudden turn of the vehicle 90, the deviation allowable region 72 is desirably limited with respect to the width of the road 70. In the example illustrated in FIG. 9, a region having a width narrower than half of the width of the road 70 is set as the deviation allowable region 72. In FIG. 9, the vehicle 90 that deviated from the target locus TL and out of the deviation allowable region 72 is indicated by a broken line. In the control device of the comparative example, when determined that the vehicle 90 has gone out of the deviation allowable region 72, a target locus TL' is regenerated to continue the travel control. That is, when determined that the vehicle 90 has gone out of the deviation allowable region 72, the regenerated target locus TL' is set even in a case where the vehicle 90 does not cross the boundary line of the road 70. Then, the traveling of the vehicle 90 is controlled such that the vehicle 90 follows the regenerated target locus TL'.

FIG. 10 illustrates a vehicle 90 in which travel control is performed by the control device 100 of the present embodiment. In FIG. 10, the vehicle 90 deviated toward the right side with respect to the target locus TL in the advancing direction of the vehicle 90 is indicated by a broken line. At this time, it is assumed that a route along the left boundary line PAL of the movable range PA calculated by the locus follow-up control unit 21 is calculated as the predicted route PT. In FIG. 10, the left boundary line PAL is indicated by a one dot chain line. In this case, the predicted deviation amount Apo calculated by the locus follow-up control unit 21 in the process of step S404 of FIG. 8 is smaller than the second deviation threshold value Tho2 as illustrated in FIG. 10. Therefore, the second regeneration trigger TGR2 is not output, and regeneration of the target locus TL is not requested (S405: NO). The target locus TL is held, and the vehicle 90 is controlled to follow the target position TP selected from the target locus TL.

Meanwhile, in a case where it is difficult for the vehicle 90 to make a turn due to a low p value of the road surface of the road 70 or the like, the movable range PA becomes narrower than a case where the p value is high and it is easier for the vehicle 90 to make a turn. In FIG. 10, a left boundary line in a case where the p value of the road surface of the road 70 is low is illustrated as a left boundary line PAL'. In this case, a route along the left boundary line PAL' is calculated as the predicted route PT. In this case, since the predicted deviation amount Apo is larger than the second deviation threshold value Tho2, it is predicted that the vehicle 90 will go out of the deviation allowable region 72. That is, the predicted deviation amount Apo calculated by the locus follow-up control unit 21 in the process of step S404 is larger than the second deviation threshold value Tho2. Therefore, the second regeneration trigger TGR2 is output, and regeneration of the target locus TL is requested (S406). As a result, the target locus TL is regenerated (S203). The vehicle 90 is controlled to follow the target position TP selected from the regenerated target locus TL.

As described above, the control device 100 can predict whether or not the vehicle 90 will go out of the deviation allowable region 72 using the predicted deviation amount Apo calculated based on the movable range PA. Therefore, according to the control device 100, the deviation allowable region 72 may not be set narrow as in the case of the control device of the comparative example. As a result, as compared with the control device of the comparative example, even if the vehicle 90 deviates from the target locus TL, the regeneration of the target locus TL is less likely to be requested. That is, when the vehicle 90 can be caused to follow the target locus TL without regenerating the target locus TL, the control device 100 is not requested to regenerate the target locus TL. According to the control device 100, the vehicle 90 can be controlled to follow the target locus TL while reducing the frequency at which the regeneration of the target locus TL is requested.

Here, when the target locus TL is regenerated, the continuity of the travel control of the vehicle 90 is likely to be interrupted with the regeneration of the target locus TL. In order to maintain the continuity of the travel control, it is preferable to regenerate the target locus TL so that the momentum of the vehicle does not greatly change before and after the target locus TL is regenerated. Therefore, when the frequency of regeneration of the target locus TL is high, the target locus TL is likely to be alternative, and the freedom of the route on which the vehicle 90 travels by the travel control is likely to be limited. According to the control device 100, the range of selection in the route on which the vehicle 90 is caused to travel in the travel control can be suppressed from being narrowed by suppressing an increase in the frequency of re-creating the target locus TL.

When the vehicle 90 deviates from the target locus TL during the execution of the travel control and the target locus TL needs to be regenerated, the range of selection of a route that can be set as the target locus TL becomes narrower, the later the timing at which the target locus TL is regenerated. In this regard, according to the control device 100, whether or not the vehicle 90 will go out of the deviation allowable region 72 can be predicted using the predicted deviation amount Apo calculated based on the movable range PA. Therefore, the regeneration of the target locus TL can be requested before the vehicle 90 actually goes out of the deviation allowable region 72. As a result, it is possible to suppress the delay of the timing at which the target locus TL is regenerated as compared with the case where the regeneration of the target locus TL is requested after the vehicle 90 actually goes out of the deviation allowable region 72. Therefore, the range of selection of a route that can be set as the target locus TL is less likely to be narrowed.

By the way, when calculating the control amount Ac for guiding the vehicle 90 to the target position TP in the travel control, it is required to consider the vehicle characteristics. Therefore, in the control device 100, the braking control unit 20 includes a vehicle model in which vehicle characteristics are stored. In the control device 100, the locus follow-up control unit 21 of the braking control unit 20 calculates the movable range PA. That is, the braking control unit 20, which is an ECU including a vehicle model, calculates the movable range PA using the vehicle model. Therefore, according to the control device 100, the movable range PA can be efficiently calculated as compared with a case where the vehicle characteristics need to be separately obtained by transmission and reception between the ECUs.

Hereinafter, a correspondence relationship between the matters in the above embodiment and the matters described in the section "Means for Solving the Problem" will be described.

The locus follow-up control unit 21 corresponds to a "route creation unit that creates the target route based on the obtained road width". The braking control unit 20 including the locus follow-up control unit 21 and the motion control unit 22 corresponds to a "control unit that derives a control amount for causing the vehicle to travel along the target route and drives the actuator based on the control amount". The follow-up route FT corresponds to a "target route".

The target locus generation unit 13 corresponds to a "main route generation unit that generates a target main route based on surrounding information of the vehicle". The target locus TL corresponds to a "target main route".

The present embodiment can be modified and implemented as follows. The present embodiment and the following modified examples can be implemented in combination with each other within a technically consistent scope.

In the embodiment described above, the flow of processing illustrated in FIGS. 3 to 5 and 8 is an example of the process related to travel control. If the road width Wi is obtained and the travel control for causing the vehicle 90 to travel so as to follow the target locus TL within the range of the road width Wi is executed, various types of processes may be executed in a flow of processing different from the flow of processing described in the above embodiment. Even in this case, as in the embodiment described above, even if the vehicle 90 is subjected to the influence of external environment, the vehicle 90 can be caused to travel within a range where the vehicle 90 can pass on the road 70.

In the embodiment described above, the length from one end to the other end of the free space 71 in the direction orthogonal to the target locus TL is the road width Wi. The road width Wi may be positional information including the position of one end of the free space 71 and the position of the other end of the free space 71 in the direction orthogonal to the target locus TL. Even in a case where the road width Wi including the positional information is used, the range where the vehicle 90 can pass can be recognized, as in the embodiment described above, and effects similar to those of the embodiment described above can be obtained.

In the embodiment described above, the locus follow-up control unit 21 calculates the follow-up route FT for causing the vehicle 90 to follow the target locus TL within the range of the road width Wi. Alternatively, the target locus generation unit 13 may generate the target locus TL in consideration of the road width Wi which is information related to the width of the road 70. In this case, the target locus TL may be sequentially updated every time the obtained road width Wi changes. Then, the locus follow-up control unit 21 calculates a follow-up route as a route connecting the target position TP selected from the target locus TL and the own vehicle position CP. Even in such a configuration, the vehicle 90 can be caused to travel along the target locus TL within the range of the road width Wi as in the embodiment described above. In this case, the target locus generation unit 13 corresponds to a "route creation unit that creates the target route based on the obtained road width". The target locus TL corresponds to a "target route".

In the embodiment described above, the gain of the feedback control is varied according to the road width Wi at the time of calculating the follow-up route FT, but the gain may be fixed at a prescribed value.

In the embodiment described above, regarding the calculation of the control amount Ac, the vehicle 90 is configured to more easily make a sudden turn as the road width Wi becomes narrower by increasing the gain of the feedback control as the road width Wi becomes narrower. In order to make the vehicle 90 make a sudden turn as the road width Wi becomes narrower, for example, the following calculation process of the control amount Ac may be adopted.

The locus follow-up control unit 21 calculates the control amount Ac based on the deviation degree between the own vehicle position CP and the target locus TL and the momentum added to the vehicle 90 when bringing the vehicle 90 closer to the target locus TL. Furthermore, the locus follow-up control unit 21 changes the specific gravity for reflecting the deviation degree on the control amount Ac and the specific gravity for reflecting the momentum on the control amount Ac based on the road width Wi. Specifically, the locus follow-up control unit 21 calculates, as the control amount Ac, a value based on a sum of a first control amount obtained by multiplying the deviation degree by a first correction term We1 and a second control amount obtained by multiplying the momentum by a second correction term We2.

Figure 11:
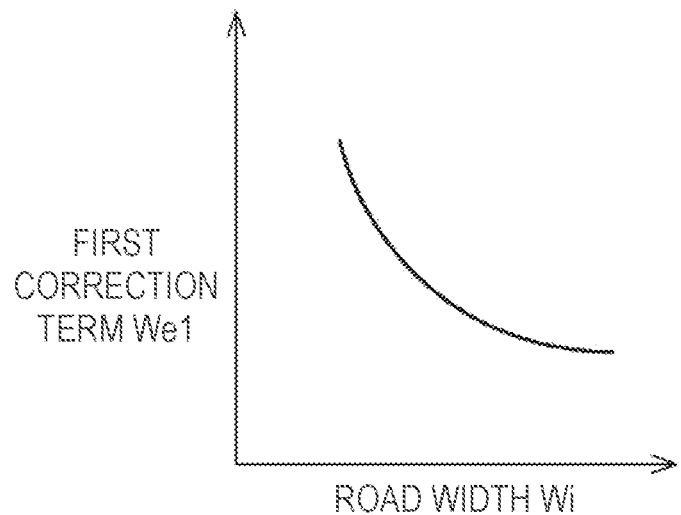
FIG. 11 is a diagram illustrating a relationship between a correction term used by a control device of a modified example to calculate a control amount and a road width.

FIG. 11 illustrates a relationship between the road width Wi and the first correction term We1. The first correction term We1 takes a value that is larger the narrower the road width Wi, and smaller the wider the road width Wi. Therefore, the specific gravity for reflecting the deviation degree on the control amount Ac is increased as the road width Wi becomes narrower.

Figure 12:
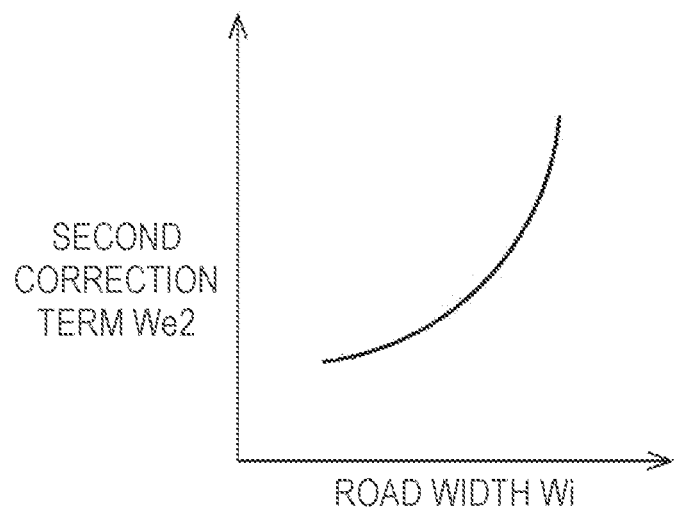
FIG. 12 is a diagram illustrating a relationship between a correction term used by a control device of a modified example to calculate a control amount and a road width.

FIG. 12 illustrates a relationship between the road width Wi and the second correction term We2. The second correction term We2 takes a value that is smaller the narrower the road width Wi, and larger the wider the road width Wi. Therefore, the specific gravity for reflecting the momentum on the control amount Ac is reduced as the road width Wi becomes narrower.

When the road width Wi in which the vehicle 90 can pass is narrow, the vehicle 90 easily crosses the boundary line of the road 70 as compared with when the road width Wi is wide. According to the above configuration, since the first correction term We1 increases as the road width Wi becomes narrower, the first control amount tends to increase. As a result, the vehicle 90 can be urged to make a sudden turn so as to resolve the deviation degree as the road width Wi becomes narrower. As a result, the vehicle 90 can be brought closer to the target locus TL at an early stage.

On the other hand, when the road width Wi is wide, there is a possibility that the vehicle 90 is greatly deviated from the target locus TL. In this case, since the first correction term We1 decreases as the road width Wi becomes wider, the first control amount is less likely to increase. As a result, the vehicle 90 can be gradually brought closer to the target locus TL. However, since the second correction term We2 increases as the road width Wi becomes wider, the control amount Ac can be increased when the momentum is large.

When the process of having the value based on the sum of the first control amount and the second control amount as the control amount Ac is adopted, the second correction term We2 may not be varied if the first correction term We1 is varied according to the road width Wi. Similarly, if the second correction term We2 is varied according to the road width Wi, the first correction term We1 may not be varied. Even when one of the first correction term We1 and the second correction term We2 is set to a prescribed value, the specific gravity for reflecting the deviation degree on the control amount Ac and the specific gravity for reflecting the momentum on the control amount Ac can be changed based on the road width Wi.

In the embodiment described above, the travel assisting unit 10 includes the target locus generation unit 13 and the target position selection unit 14. The travel assisting unit 10 does not necessarily include the target locus generation unit 13 which is a functional unit for generating the target locus TL and the target position selection unit 14 which is a functional unit for selecting the target position TP.

Figure 13:
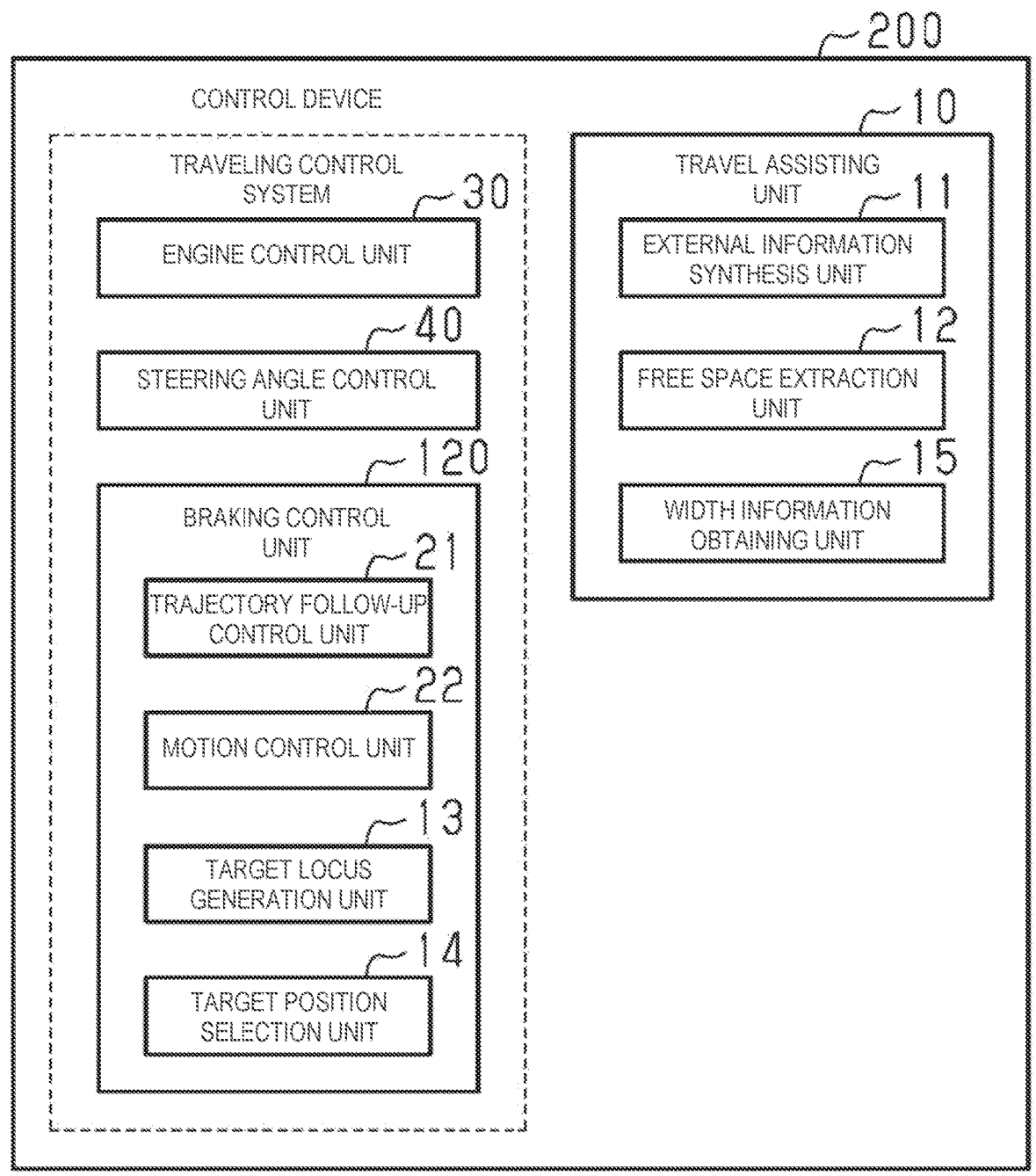
FIG. 13 is a block diagram illustrating a control device according to another modified example.

For example, as illustrated in FIG. 13, the control device 200 may include a braking control unit 120 including a target locus generation unit 13 and a target position selection unit 14. Note that, in the control device 200 illustrated in FIG. 13, the same components as those in the above embodiment are denoted with the same reference numerals as those in the above embodiment.

In the embodiment described above, the locus follow-up control unit 21 may be provided in the travel assisting unit 10 instead of the braking control unit 20. In this case, various types of information necessary for calculating the movable range PA and the follow-up route FT are output from the braking control unit 20 to the travel assisting unit 10.

In the embodiment described above, for example, as illustrated in FIG. 10, an example is illustrated in which the target locus TL is set to pass through the center of the road 70. When the target locus TL is generated so as to pass through the center of the road 70, the first deviation threshold value Tho1 and the second deviation threshold value Tho2 have the same magnitude on the right side and the left side with respect to the target locus TL in the advancing direction of the vehicle 90.

On the other hand, the target locus TL may be set so as not to pass through the center of the road 70. In this case, the first deviation threshold value Tho1 and the second deviation threshold value Tho2 have different magnitudes on the right side and the left side with respect to the target locus TL in the advancing direction of the vehicle 90. Therefore, the corresponding deviation threshold value is used depending on which side, the left or the right, the vehicle 90 deviates with respect to the target locus TL. By comparing with the deviation amount Ao or the predicted deviation amount Apo using an appropriate deviation threshold value, whether or not regeneration of the target locus TL is necessary can be determined regardless of the position where the target locus TL passes.

In the embodiment described above, the target locus generation unit 13 is requested to regenerate the target locus TL based on the detection of the first regeneration trigger TGR1 or the second regeneration trigger TGR2. The configuration for requesting the regeneration of the target locus TL is not limited to the output of the trigger signal. For example, a configuration may be adopted in which the regeneration request flag is turned on when the regeneration of the target locus TL is requested, and the target locus TL is regenerated by the target locus generation unit 13 when the regeneration request flag is turned on.

In the embodiment described above, the vehicle 90 including the internal combustion engine 91 is illustrated. The drive source of the vehicle 90 is not limited to the internal combustion engine 91. For example, the vehicle 90 may be a hybrid vehicle using a motor generator and the internal combustion engine 91 as a drive source. In addition, the vehicle 90 may be an electric vehicle using only a motor for a drive source.

Next, a technical idea that can be grasped from the above embodiments and the modified examples will be described.

(A) A vehicle control device that controls an actuator to cause a vehicle to travel based on a target locus, the vehicle control device including:
a travel assisting unit including an external information synthesis unit that grasps an environment around the vehicle, and a control unit that communicates with the travel assisting unit; where
the control unit includes,
a target locus generation unit that generates the target locus based on the environment around the vehicle obtained from the travel assisting unit; and
a target coordinate selection unit that sets a point on the target locus as a target position.

(B) The control unit executes a process of calculating a control amount for causing the vehicle to follow the target position.

(C) The control unit executes a process of instructing the actuator to perform driving based on the control amount.

(D) The control unit executes,
a process of calculating a movable range as a range where the vehicle is able to reach when the vehicle is caused to travel with a current position of the vehicle as a starting point, based on a motion state quantity of the vehicle accompanying the driving of the actuator,
a process of determining whether a position of the vehicle deviates from the target locus based on the movable range and the target position, and
a process of requesting the target locus generation unit to regenerate the target locus when determination is made that the position of the vehicle deviates from the target locus; and
the target locus generation unit regenerates the target locus when regeneration of the target locus is requested from the control unit.

(E) The control unit derives a predicted deviation amount, which is a predicted value of a deviation between a position where the vehicle reaches when the vehicle is caused to travel toward the target position and the target position, by using the movable range, and determines that the position of the vehicle deviates from the target locus when a magnitude of the predicted deviation amount is larger than a predicted deviation threshold value.

Hereinafter, a correspondence relationship between the matters in the embodiment and the matters in the technical idea will be described.

The braking control unit 20 corresponds to a "control unit that communicates with the travel assisting unit". The locus follow-up control unit 21 executes a "process of calculating a control amount". The motion control unit 22 executes a "process of instructing the actuator to perform driving based on the control amount". Furthermore, the locus follow-up control unit 21 executes a "process of calculating a movable range", a "process of determining whether or not the position of the vehicle deviates from the target locus", and a "process of requesting the target locus generation unit to regenerate the target locus". The locus follow-up control unit 21 calculates a "predicted deviation amount that is a predicted value of a deviation between a position where the vehicle reaches when the vehicle is caused to travel toward the target position and the target position" as the predicted deviation amount Apo. The locus follow-up control unit 21 determines that the position of the vehicle deviates from the target locus when the magnitude of the predicted deviation amount is larger than a predicted deviation threshold value.

The invention claimed is:

1. A vehicle control device that causes a vehicle to travel based on a target route by controlling an actuator of the vehicle, the vehicle control device comprising:
a width information obtaining unit that obtains a road width in which the vehicle can pass in a road on which the vehicle travels;
a route creation unit that creates the target route based on the obtained road width;
a control unit that derives a control amount for causing the vehicle to travel along the target route and drives the actuator based on the control amount; and
a main route generation unit that generates a target main route based on surrounding information of the vehicle; wherein
the control unit derives, as the control amount, a follow-up control amount for causing the vehicle to follow the target main route within a range of the road width, and executes a follow-up control for instructing driving of the actuator with the follow-up control amount;
the route creation unit creates the target route as a route on which the vehicle travels in the follow-up control of causing the vehicle to follow the target main route within a range of the road width;
the route creation unit, when bringing the position of the vehicle closer to the target main route in the follow-up control, creates the target route such that the narrower the road width, the sharper a turn toward the target main route; and
the route creation unit calculates the target route to deviate from the target main route based on a target position selected from one of a plurality of points on the target main route within the movable range of the vehicle.

2. The vehicle control device according to claim 1, wherein in the follow-up control, the control unit derives the follow-up control amount by feedback control using a deviation degree between the position of the vehicle and the target main route as an input, and
a gain of the feedback control becomes larger as the road width becomes narrower.

3. The vehicle control device according to claim 1, wherein in the follow-up control, the control unit derives the follow-up control amount based on a deviation degree between the position of the vehicle and the target main route and a momentum added to the vehicle when the vehicle is caused to approach the target main route, and
when deriving the follow-up control amount, the control unit increases a weighting by which the deviation degree is reflected in the follow-up control amount as the road width becomes narrower.

* * * * *